US008953348B2

(12) United States Patent
Sugawara

(10) Patent No.: US 8,953,348 B2
(45) Date of Patent: Feb. 10, 2015

(54) SWITCHING POWER SUPPLY CIRCUIT AND POWER FACTOR CONTROLLER

(75) Inventor: Takato Sugawara, Mastumoto (JP)

(73) Assignee: Fuji Electric Co., Ltd. (JP)

( * ) Notice: Subject to any disclaimer, the term of this patent is extended or adjusted under 35 U.S.C. 154(b) by 399 days.

(21) Appl. No.: 13/498,633

(22) PCT Filed: Oct. 27, 2010

(86) PCT No.: PCT/JP2010/006347
§ 371 (c)(1),
(2), (4) Date: Mar. 28, 2012

(87) PCT Pub. No.: WO2011/052197
PCT Pub. Date: May 5, 2011

(65) Prior Publication Data
US 2012/0201063 A1 Aug. 9, 2012

(30) Foreign Application Priority Data

Oct. 29, 2009 (JP) .................................. 2009-248597
Jun. 4, 2010 (JP) .................................. 2010-128700

(51) Int. Cl.
H02M 7/217 (2006.01)
H02M 1/42 (2007.01)
H02M 3/156 (2006.01)

(52) U.S. Cl.
CPC ............ H02M 3/156 (2013.01); H02M 1/4225 (2013.01); Y02B 70/126 (2013.01)
USPC ............................... 363/89; 323/207; 323/222

(58) Field of Classification Search
USPC ................................ 363/89; 323/207, 222, 285
See application file for complete search history.

(56) References Cited

U.S. PATENT DOCUMENTS 7,279,869 B2 * 10/2007 Tzeng et al. .................... 323/222
8,213,200 B2 * 7/2012 Shimizu ............................ 363/89
2004/0095101 A1 * 5/2004 Pidutti et al. .................... 323/222

(Continued)

FOREIGN PATENT DOCUMENTS

JP 2005-020994 A 1/2005
JP 2006-296158 A 10/2006

(Continued)

OTHER PUBLICATIONS

International Search Report issued for PCT/JP2010/006347, Dec. 28, 2010.

Primary Examiner — Fred E Finch, III
(74) Attorney, Agent, or Firm — Rossi, Kimms & McDowell LLP

(57) ABSTRACT

The switching power supply circuit includes a full-wave rectifier (1) which full-wave rectifies alternating power-supply voltage to output a pulsating current, and an inductor (3) connected to the full-wave rectifier (1). A level conversion circuit (20) includes a plurality of resistors connected in series, and converts inductor current detection voltage to a first current level signal and a second current level signal (S1 and S2) which are different in voltage level and which are proportional to inductor current. A continuous control setting circuit (30) generates a reference potential signal a phase of which is approximately the same as a phase of alternating input voltage from the first current level signal (S1) and compares a voltage level of the reference potential signal with a voltage level of the second current level signal (S2) to output a second set pulse (S8) that specifies timing at which a switching element (4) turns on.

9 Claims, 13 Drawing Sheets

(56) References Cited

U.S. PATENT DOCUMENTS

| | | |
|---|---|---|
| 2004/0263140 A1 | 12/2004 | Adragna et al. |
| 2005/0068796 A1* | 3/2005 | Morita .......................... 363/120 |
| 2009/0016087 A1 | 1/2009 | Shimizu |
| 2010/0165683 A1* | 7/2010 | Sugawara ..................... 363/126 |
| 2011/0102950 A1* | 5/2011 | Park et al. ....................... 361/18 |
| 2011/0141631 A1* | 6/2011 | Yabuzaki et al. ............... 361/18 |

FOREIGN PATENT DOCUMENTS

| | | |
|---|---|---|
| JP | 2008-193818 A | 8/2008 |
| JP | 2009-038957 A | 2/2009 |

\* cited by examiner

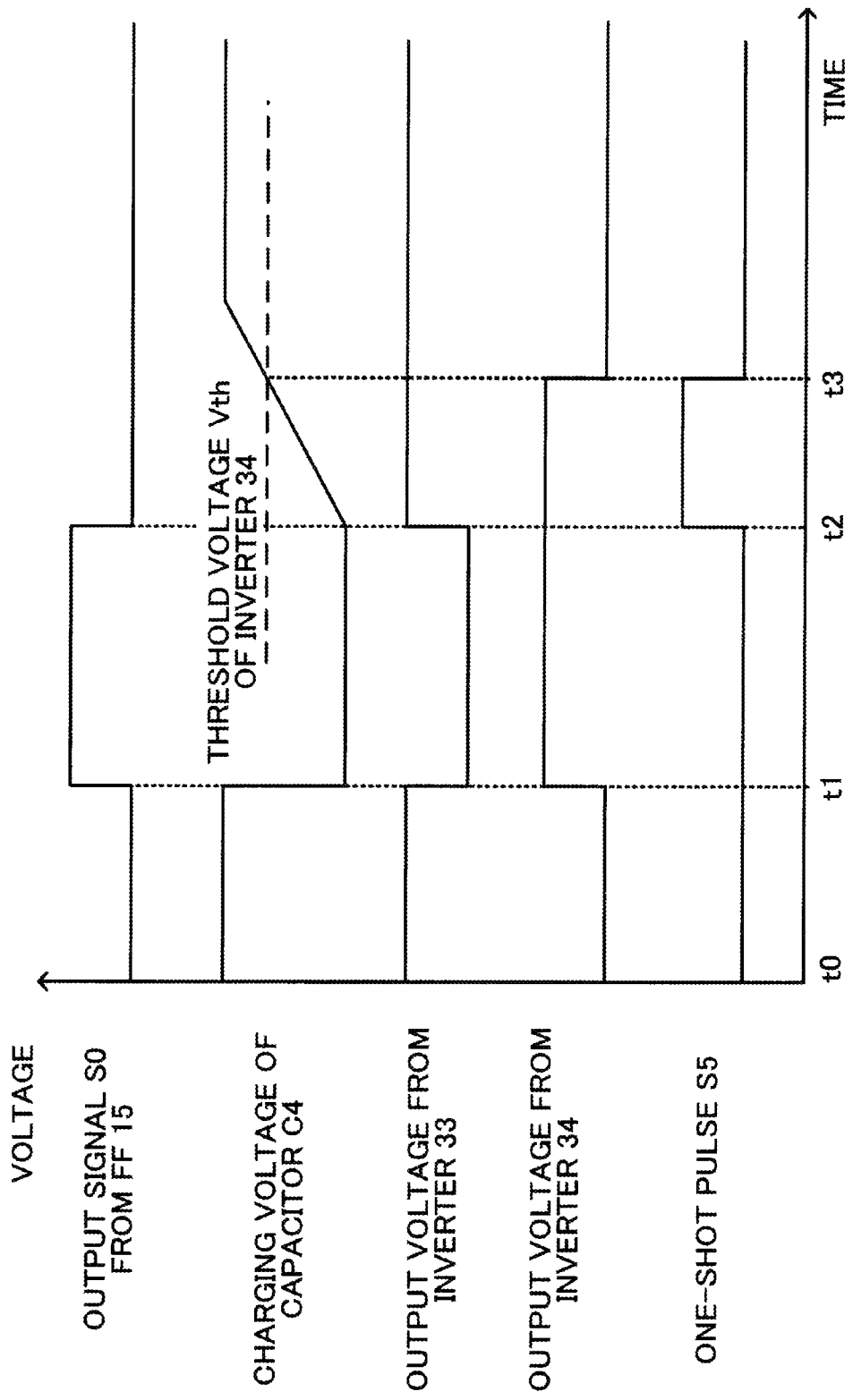

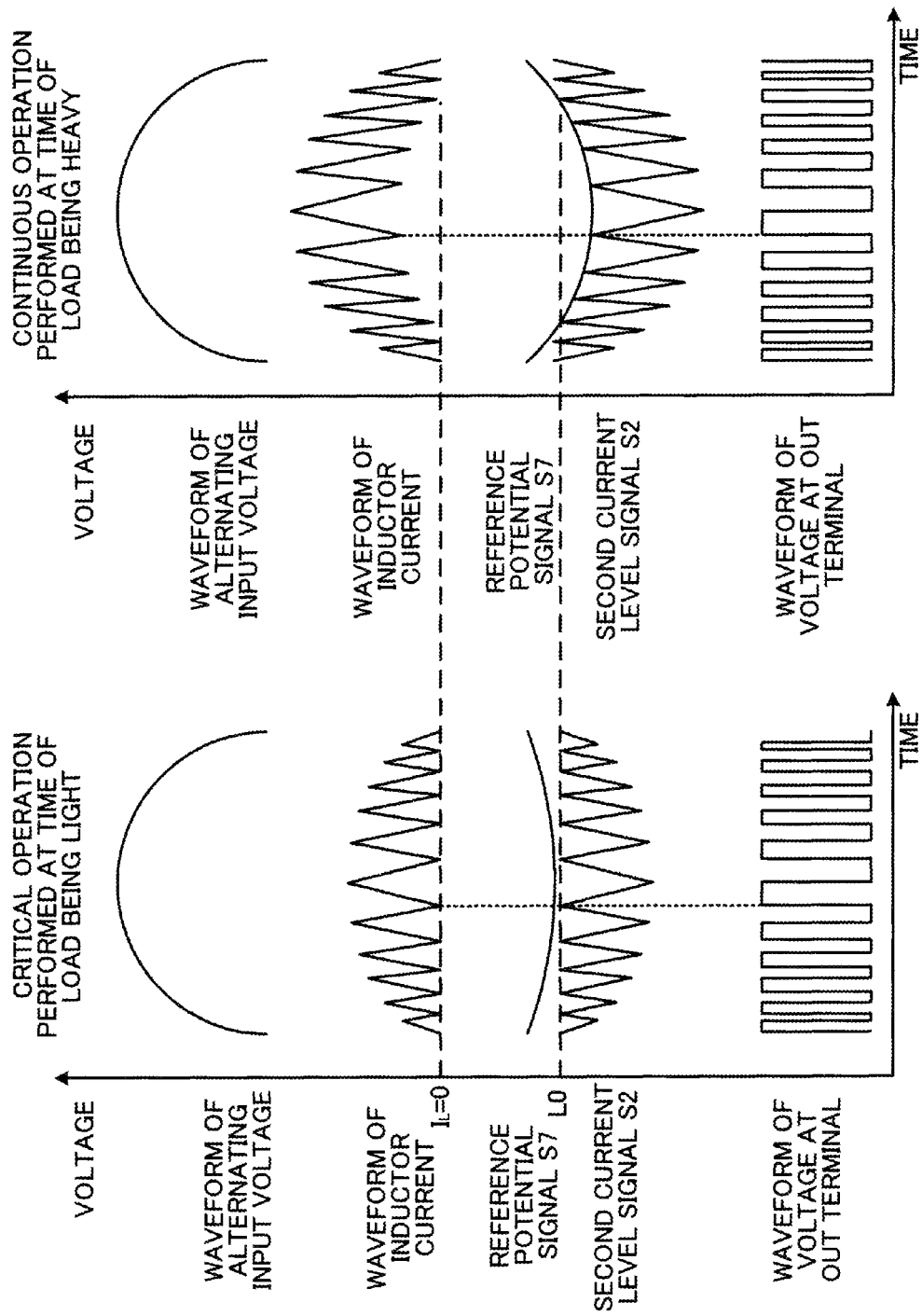

US 8,953,348 B2

SWITCHING POWER SUPPLY CIRCUIT AND POWER FACTOR CONTROLLER

This application is a U. S. National Phase Application of PCT International Application PCT/JP2010/006347 filed on Oct. 27, 2010 which is based on and claims priority from JP 2009-248597 filed on Oct. 29, 2009 and JP2010-128700 filed on Jun. 4, 2010 the contents of which are incorporated herein in their entirety by reference.

TECHNICAL FIELD

This invention relates to a switching power supply circuit for supplying determined direct-current output voltage from alternating power supply to a load and a power factor controller and, more particularly, to a switching power supply circuit and a power factor controller which can perform switching between a critical current control method and a continuous current control method.

BACKGROUND ART

With many electronic devices to which commercial alternating power-supply voltage (AC 100 to 240 V) is supplied, a switching power supply circuit is used for obtaining direct-current voltage for driving an internal electronic circuit. Accordingly, the switching power supply circuit needs a rectifying circuit for converting commercial alternating power-supply voltage to direct-current voltage. If power factor improvement is not made, current flows to a smoothing capacitor connected to the rectifying circuit only at the time of input voltage being near a peak. As a result, high-frequency current and voltage components are generated in the rectifying circuit. These components are a source of high-frequency noise and cause a drop in power factor.

A power factor is a value obtained by dividing input effective power Pi (W), which is the time-average of the product of input voltage and input current in an alternating circuit, by apparent power (which is the product of the effective value of the input voltage and the effective value of the input current). Effective power is obtained by multiplying apparent power by a coefficient (power factor) which depends on a load. If AC 100 V is applied to a simple resistance load, the phases of voltage and current are the same and a power factor is 1. However, the phase of current may deviate from the phase of voltage due to a load other than a resistor. In this case, in order to compensate for a drop in power factor corresponding to the amount of the deviation, it is necessary to increase input current. This causes an increase in power loss on an input line. Therefore, it is necessary to control this power loss by preventing a drop in power factor by the use of a PFC (Power Factor Controller) and to control the above high-frequency noise.

FIG. 13 illustrates a switching power supply circuit including a conventional power factor controller using a fixed on-width control method.

A power factor controller improves a power factor by making the phase of input current equal to the phase of alternating input voltage rectified by a rectifying circuit in a switching power supply circuit, and controls high-frequency current and voltage which cause harmful EMI (Electro Magnetic Interference) or destruction of a device. In the switching power supply circuit illustrated in FIG. 13, alternating input voltage is full-wave rectified by a full-wave rectifier 1. One end of a capacitor 2 is connected to an output side of the full-wave rectifier 1. High-frequency components generated as a result of the switching operation of a switching element 4 described later are removed by the capacitor 2. A step-up circuit including a primary inductor 3 of a transformer T, the switching element 4 which is a MOSFET (Metal-Oxide Semiconductor Field-Effect Transistor), a diode 5, and a capacitor 6 is also connected to the output side of the full-wave rectifier 1. Rectified voltage outputted from the full-wave rectifier 1 is increased and rectified by the step-up circuit. By doing so, a direct-current output voltage of, for example, about 400 volts can be supplied to a load (not illustrated) connected between an output terminal 7 and ground.

A power factor controller 100 includes an integrated circuit into which various kinds of functions are integrated, and has a FB terminal for receiving a feedback signal, an IS terminal for detecting current which flows through the switching element 4, an OUT terminal for output, a ZCD (Zero Current Detection) terminal for receiving a zero cross signal, a RT terminal for connecting a resistor which determines the waveform of the oscillation of an oscillator 13, and a COMP terminal for connecting a phase compensation element. In addition, the integrated circuit includes an error amplifier 11 for amplifying and outputting the difference between the detected value of output voltage inputted to the FB terminal and reference voltage Vref, a PWM (Pulse Width Modulation) comparator 12, the oscillator 13, OR circuits 14a and 14b, a RS flip-flop (FF) 15, a ZCD comparator 16, a timer 17, an OVP (Over Voltage Protection) comparator 18 for protecting against overvoltage, and a comparator 19 for detecting overcurrent.

The RT terminal of the power factor controller 100 is connected to one end of a timing resistor R1 the other end of which is grounded. The ZCD terminal is connected to one end of a secondary inductor 8 of the transformer T via a resistor R2 and the other end of the secondary inductor 8 is grounded. The OUT terminal is connected to a gate terminal of the MOSFET which is the switching element 4. A source terminal of the switching element 4 is connected to one end of a current detection resistor R3 the other end of which is grounded. A point at which the source terminal of the MOSFET and the one end of the current detection resistor R3 are connected is connected to the IS terminal. The output terminal 7 is grounded via voltage division resistors R4 and R5 connected in series. A point at which the voltage division resistors R4 and R5 are connected is connected to the FB terminal. The COMP terminal is grounded via a capacitor C1. A resistor R6 and a capacitor C2 are connected in series and are connected in parallel with the capacitor C1. In addition, the power factor controller 100 has a VCC terminal (not illustrated) for receiving power-supply voltage, a GND terminal (not illustrated) for ground connection.

With the above switching power supply circuit the power factor controller 100 makes the phase of inductor current $I_L$ which flows through the step-up circuit equal to the phase of the alternating input voltage full-wave rectified by the full-wave rectifier 1. As a result, its power factor is improved.

The error amplifier 11 of the power factor controller 100 is a transconductance amplifier. The reference voltage Vref is inputted to a non-inverting input terminal of the error amplifier 11 and an inverting input terminal of the error amplifier 11 is connected to the FB terminal. An output terminal of the error amplifier 11 is connected to the COMP terminal and an inverting input terminal of the PWM comparator 12. An output terminal of the PWM comparator 12 is connected to a reset terminal of the RS flip-flop 15 via the OR circuit 14a. The oscillator 13 is connected to the external timing resistor R1 via the RT terminal and generates a sawtooth oscillation output the slope of which corresponds to the resistance value of the timing resistor R1. The oscillation output is supplied to a non-inverting input terminal of the PWM comparator 12. Reference voltage Vzcd is inputted to a non-inverting input terminal of the ZCD comparator 16 and an inverting input terminal of the ZCD comparator 16 is connected to the ZCD terminal.

An output signal from the ZCD comparator 16 and an output signal from the timer 17 are supplied to a set terminal of the RS flip-flop 15 via the OR circuit 14b. An output signal S0 from an output terminal Q of the RS flip-flop 15 is supplied to the gate terminal of the switching element 4 via the OUT terminal. Reference voltage Vovp is inputted to an inverting input terminal of the OVP comparator 18 and a non-inverting input terminal of the OVP comparator 18 is connected to the FB terminal An output terminal of the OVP comparator 18 is connected to the reset terminal of the RS flip-flop 15 via the OR circuit 14a. Reference voltage Vovc is inputted to an inverting input terminal of the comparator 19 and a non-inverting input terminal of the comparator 19 is connected to the IS terminal An output terminal of the comparator 19 is connected to the reset terminal of the RS flip-flop 15 via the OR circuit 14a.

Operation performed for improving a power factor by the fixed on-width control method is as follows. The ZCD comparator 16 detects a voltage value at which the inductor current $I_L$ which flows through the primary inductor 3 of the transformer T included in the step-up circuit becomes zero. When the ZCD comparator 16 detects that the inductor current $I_L$ is zero, an output signal from the ZCD comparator 16 becomes H (High) and sets the RS flip-flop 15 via the OR circuit 14b. As a result, the output signal S0 from the RS flip-flop 15 becomes H and this signal is outputted from the OUT terminal. Accordingly, the switching element 4 turns on. In addition, the output signal from the ZCD comparator 16 is inputted to the oscillator 13. When the oscillator 13 is triggered by the output signal from the ZCD comparator 16, the oscillator 13 begins to generate a sawtooth oscillation output (sawtooth signal) at the same timing when the switching element 4 turns on. When the sawtooth signal reaches a determined value, the oscillator 13 stops generating an oscillation output, resets an oscillation output to an initial value, and waits for the next trigger input.

A signal obtained by dividing direct-current voltage outputted to the output terminal 7 by the voltage division resistors R4 and R5 is then fed back to the FB terminal as feedback voltage. An error signal Verr obtained by amplifying the difference between the feedback voltage and the reference voltage Vref is generated by the error amplifier 11. The PWM comparator 12 compares the error signal Verr with the sawtooth signal from the oscillator 13. When the PWM comparator 12 detects that the sawtooth signal has reached the level of the error signal Verr, the PWM comparator 12 outputs a reset signal to the RS flip-flop 15 via the OR circuit 14a. As a result, the output signal S0 from the RS flip-flop 15 becomes L (Low). When the output signal S0 which has become L is outputted from the OUT terminal of the power factor controller 100, the switching element 4 turns off.

If the magnitude of the load connected to the output terminal 7 of the switching power supply circuit is constant at this time, then the error signal Verr is also constant and an on-width of the switching element 4 is time from a point at which the sawtooth signal starts from a reference value to a point at which the sawtooth signal reaches the error signal Verr. Therefore, the on-width is controlled so that it will be constant. However, alternating voltage is inputted to the switching power supply circuit, so voltage across the primary inductor 3 changes according to the phase angle. As a result, the slope of the inductor current $I_L$ which flows through the primary inductor 3 of the transformer T changes according to input voltage. The peak value of the inductor current, that is to say, a current value at the timing at which the switching element 4 turns off is proportional to the alternating input voltage and the power factor is improved.

Control methods by power factor controllers are broadly divided into two methods: a continuous current control method and a critical current control method. The above fixed on-width control method belongs to the critical current control method. With the critical current control method, timing at which inductor current $I_L$ that flows through an inductor (corresponding to the inductor 3 illustrated in FIG. 13) becomes zero is detected and a switching element is turned on at that timing. The critical current control method detects that the inductor current $I_L$ becomes zero, and turns on the switching element 4. Accordingly, soft switching can be realized. Compared with the continuous current control method by which hard switching is realized, turn-on loss is small and efficiency is high. With the critical current control method, on the other hand, the peak value of the inductor current $I_L$ is high compared with the continuous current control method. As a result, it is necessary to increase the current capacity of the inductor. Therefore, the critical current control method is used by a power factor controller the power consumption of which is low, for example, about 250 W or less, and is not suitable for a power factor controller the power consumption of which is higher than 250 W.

Therefore, in order to take advantage of the merit of the critical current control method even in a power factor controller the power consumption of which is high, the following control methods are proposed in patent literature 1 through 4. The magnitude of a load is detected by the use of an auxiliary winding (corresponding to the secondary inductor 8 of the transformer T illustrated in FIG. 13). If the magnitude of the load is smaller than or equal to a determined value, then the critical current control method is applied. If the magnitude of the load is greater than or equal to the determined value, then the continuous current control method is applied.

In patent literatures 1 through 3, switching between the critical current control method and the continuous current control method is performed by the use of the fact that time from a point at which a switching element turns off to a point at which inductor current becomes zero becomes longer with an increase in the magnitude of a load (with an increase in the inductor current at the time of the switching element turning off). This is the same with the switching power supply circuit illustrated in FIG. 13. That is to say, in the switching power supply circuit illustrated in FIG. 13, zero current is detected with the secondary inductor 8 of the transformer T as an auxiliary winding. Timing at which the zero current is detected is compared with timing at which determined time elapses on the timer 17 after the turning off of the switching element 4. The RS flip-flop 15 is controlled so that the switching element 4 will be turned on at the earlier timing of the former and the latter. As a result, the continuous current control method is applied in a heavy load region where time which elapses before the detection of the zero current is longer than the determined time specified by the timer 17, and the critical current control method is applied in a light load region where time which elapses before the detection of the zero current is shorter than or equal to the determined time specified by the timer 17.

In patent literature 4, that inductor current becomes zero is not detected directly by an auxiliary winding. The magnitude of a load is determined on the basis of the fact that a positive voltage is outputted from the auxiliary winding at the time of a switching element being in an off state and that a negative voltage is outputted from the auxiliary winding at the time of the switching element being in an on state. That is to say, a capacitor externally connected is charged and discharged by the use of an output from the auxiliary winding so that while the switching element is in the off state, integrated voltage of the capacitor will rise. When the integrated voltage exceeds a determined value, the determination that off time of the switching element is long and that a load is heavy is made and the continuous current control method is applied. The critical current control method is applied in a light load region where the integrated voltage does not exceed the determined value.

CITATION LIST

Patent Literature

[PTL 1]
Japanese Laid-open Patent Publication No. 2006-296158 (see, for example, paragraphs [0012]-[0050] and FIG. 1)
[PTL 2]
Japanese Laid-open Patent Publication No. 2005-20994 (see, for example, paragraphs [0145]-[0197] and FIG. 5)
[PTL 3]
US Laid-open Patent Publication No. 2004/263140 (see, for example, paragraphs [0035]-[0074] and FIG. 3)
[PTL 4]
Japanese Laid-open Patent Publication No. 2008-193818 (see, for example, paragraphs [0011]-[0046] and FIG. 1)

SUMMARY OF INVENTION

Technical Problem

With each of the above power factor controllers voltage outputted from an auxiliary winding is used for realizing the critical current control method or performing switching between the critical current control method and the continuous current control method. As a result, it is impossible to remove the auxiliary winding itself. Therefore, the costs of the switching power supply circuit cannot be reduced.

The present invention was made under the background circumstances described above. An object of the present invention is to provide a switching power supply circuit and a power factor controller which can perform switching between the critical current control method and the continuous current control method without an auxiliary winding.

Solution to Problem

In order to solve the above problem, according to the present invention there is provided a switching power supply circuit for supplying determined direct-current output voltage from alternating power supply to a load, the switching power supply circuit including a rectifying circuit which full-wave rectifies alternating power-supply voltage to output a pulsating current, an inductor connected to the rectifying circuit, a switching element, and an output capacitor. The switching power supply circuit includes an inductor current detection circuit which detects current that flows through the inductor and which outputs inductor current detection voltage, a level conversion circuit which converts the inductor current detection voltage to a first current level signal and a second current level signal different in voltage level, a continuous control setting circuit which generates a reference potential signal a phase of which is approximately the same as a phase of full-wave rectified alternating input voltage from the first current level signal and which compares a voltage level of the reference potential signal with a voltage level of the second current level signal to generate a signal that specifies timing at which the switching element turns on, and a zero current detection circuit which detects that current which flows through the inductor becomes zero.

The feature of this switching power supply circuit is that the switching element turns on at the earlier timing of the timing at which the switching element turns on and which is specified by the continuous control setting circuit and timing at which the zero current detection circuit detects that current which flows through the inductor becomes zero.

In addition, according to the present invention there is provided a power factor controller including a level conversion circuit which converts the inductor current detection voltage to a first current level signal and a second current level signal different in voltage level, a continuous control setting circuit which generates a reference potential signal a phase of which is approximately the same as a phase of full-wave rectified alternating input voltage from the first current level signal and which compares a voltage level of the reference potential signal with a voltage level of the second current level signal to generate a signal that specifies timing at which the switching element turns on, and a zero current detection circuit which detects that current which flows through the inductor becomes zero, the switching element turning on at the earlier timing of the timing at which the switching element turns on and which is specified by the continuous control setting circuit and timing at which the zero current detection circuit detects that current which flows through the inductor becomes zero.

With this power factor controller, an external terminal used for changing the voltage level of the reference potential signal by the resistance value of a resistor externally connected can be formed.

Advantageous Effects of Invention

According to the present invention, a switching power supply circuit and a power factor controller which can perform switching from critical operation to continuous operation without an auxiliary winding can be provided.

BRIEF DESCRIPTION OF DRAWINGS

FIG. 1 is a circuit diagram of a switching power supply circuit according to a first embodiment.
FIG. 2 is a circuit diagram which illustrates the concrete structure of a level conversion circuit and a continuous control setting circuit included in a power factor controller illustrated in FIG. 1.
[FIG. 3]
FIG. 3 is a timing chart of the waveforms of signals inputted to and outputted from a one-shot circuit included in the continuous control setting circuit illustrated in FIG. 2.
[FIGS. 4]
[FIGS. 5]
FIGS. 5(A) and 5(B) are waveforms indicative of the operation of the power factor controller illustrated in FIG. 1, FIG. 5(A) being waveforms indicative of critical operation performed at the time of a load being light, FIG. 5(B) being waveforms indicative of continuous operation performed at the time of the load being heavy.

FIG. 6 is the waveform of inductor current which flows in the switching power supply circuit according to the first embodiment at the time of the load being heavy.

FIG. 7 indicates the peak value of the inductor current which flows at the time of the load being heavy, and also indicates, for comparison, the peak value of inductor current in a conventional circuit using only the critical current control method.

FIG. 8 is a circuit diagram of a switching power supply circuit according to a second embodiment.

FIG. 9 is a circuit diagram which illustrates the concrete structure of a level conversion circuit and a continuous control setting circuit included in a power factor controller illustrated in FIG. 8.

[FIGS. 10]

FIG. 11 illustrates the comparison result of the peak values of inductor current at the time of the load being heavy in the case of external resistors different in resistance value being connected to the power factor controller illustrated in FIG. 8.

FIG. 12 illustrates a change in inductor current with respect to heat generation in a switching element; and

FIG. 13 illustrates a switching power supply circuit including a conventional power factor controller using a fixed on-width control method.

DESCRIPTION OF EMBODIMENTS

Embodiments of the present invention will now be described with reference to the accompanying drawings.

EXAMPLE 1

Figure 1:
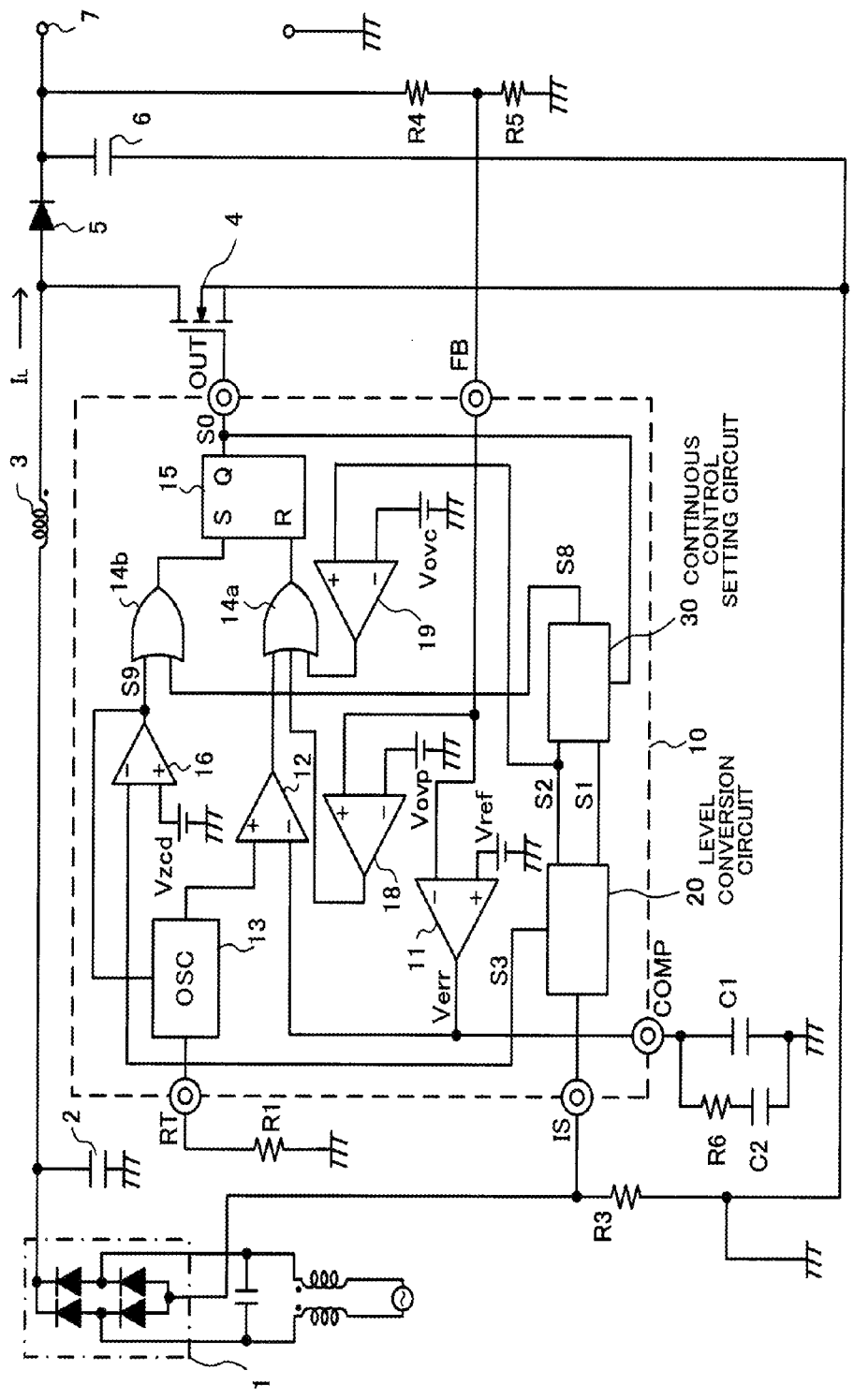
[FIG. 1]

FIG. 1 is a circuit diagram of a switching power supply circuit according to a first embodiment. Components corresponding to those included in the switching power supply circuit illustrated in FIG. 13 as a conventional example will be marked with the same reference symbols and repetitive Descriptions will be omitted.

The switching power supply circuit illustrated in FIG. 1 includes a full-wave rectifier 1 which full-wave rectifies alternating power-supply voltage and which outputs a pulsating current, and an inductor 3 connected to the full-wave rectifier 1. The switching power supply circuit supplies determined direct-current output voltage from alternating power supply to a load. The switching power supply circuit on-off controls a switching element 4 by a power factor controller 10 which performs switching between critical operation and continuous operation without an auxiliary winding. Accordingly, the power factor controller 10 illustrated in FIG. 1 differs from the conventional power factor controller 100 of the switching power supply circuit illustrated in FIG. 13 in the following three respects.

Figure 13:
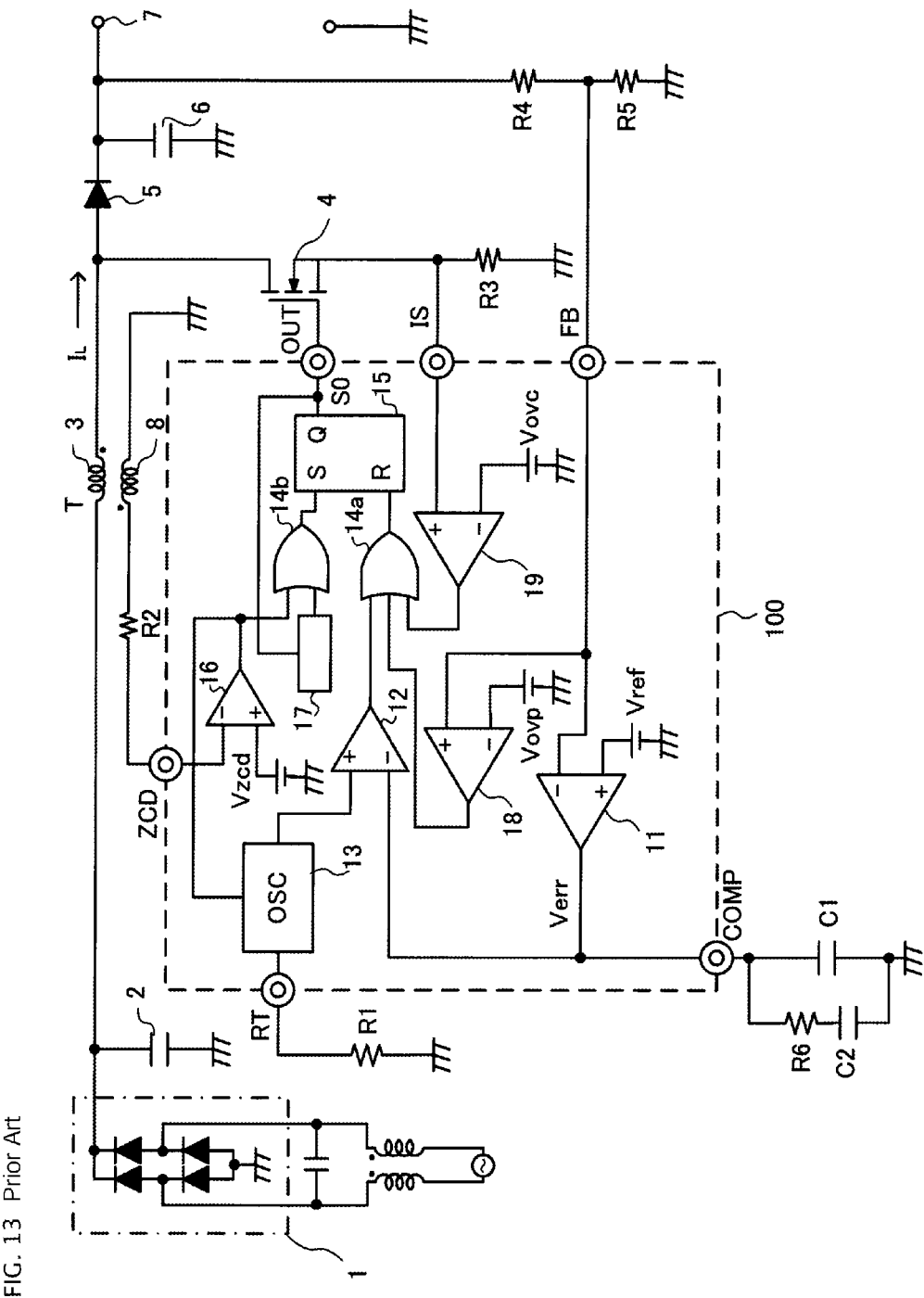
[FIG. 13]

First, the power factor controller 10 differs from the power factor controller 100 in that a level conversion circuit 20 and a continuous control setting circuit 30 are added. Secondly, the power factor controller 10 differs from the power factor controller 100 in that when inductor current $I_L$ flows through a current detection resistor R3 included in an inductor current detection circuit illustrated in FIG. 1, negative inductor current detection voltage is generated and is supplied to an IS terminal of the power factor controller 10. Thirdly, the power factor controller 10 differs from the power factor controller 100 in that the timer 17 illustrated in FIG. 13 is not included. In addition, the switching power supply circuit illustrated in FIG. 1 differs from the switching power supply circuit illustrated in FIG. 13 in that the secondary inductor 8 of the transformer T is not included.

Current level signals S1, S2, and S3 outputted from the level conversion circuit 20 and a second set pulse S8 supplied from the continuous control setting circuit 30 to a RS flip-flop 15 via an OR circuit 14b will be described in detail in FIG. 2 which illustrates the concrete structure of the level conversion circuit 20 and the continuous control setting circuit 30. In addition, an output signal from a ZCD comparator 16 to which the current level signal S3 is supplied will be referred to as a first set pulse S9.

Figure 2:
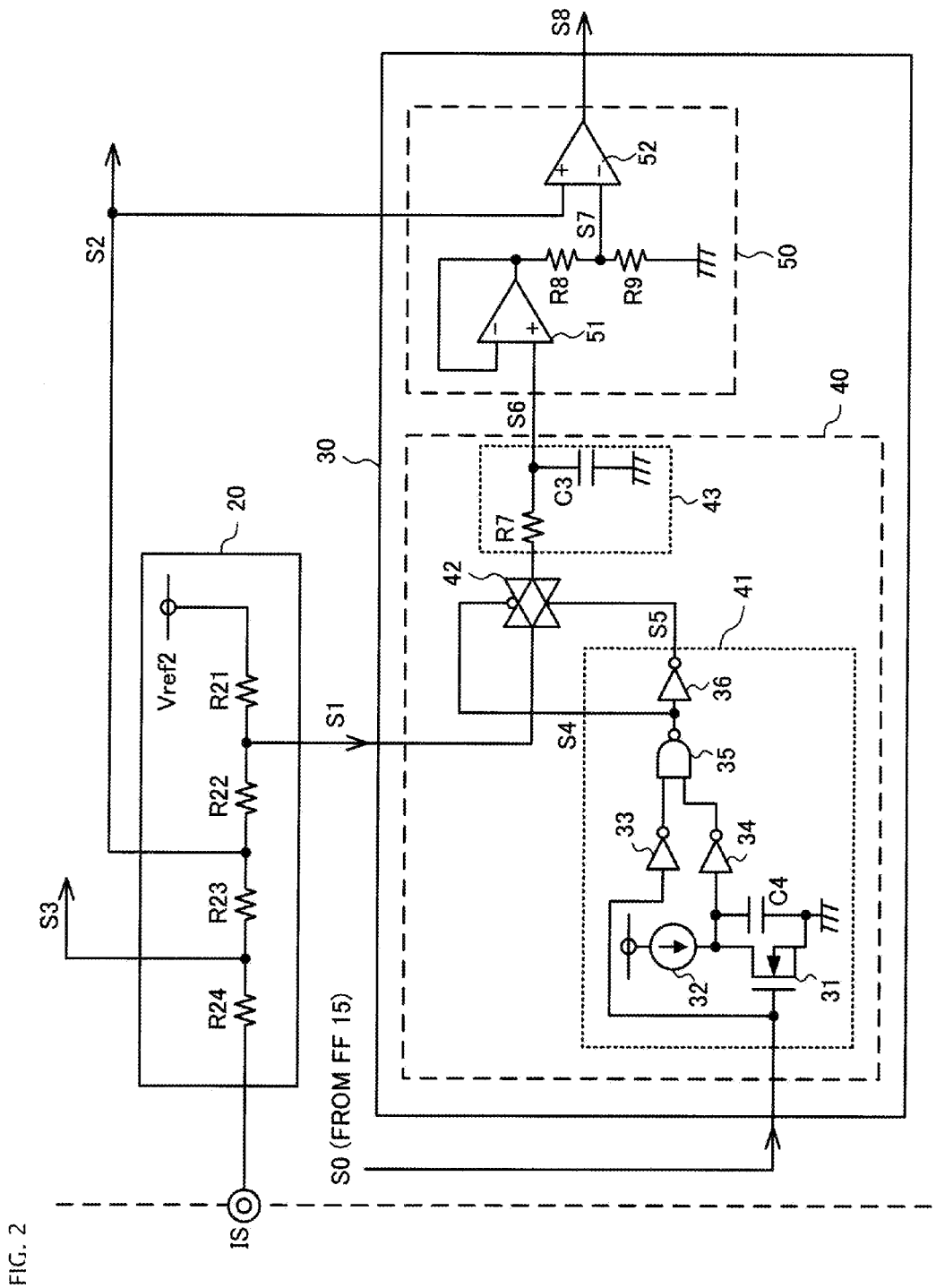
[FIG. 2]

FIG. 2 is a circuit diagram which illustrates the concrete structure of the level conversion circuit and the continuous control setting circuit included in the power factor controller illustrated in FIG. 1.

The level conversion circuit 20 includes four resistors R21 through R24 connected in series. One end is connected to positive reference voltage Vref2 and the other end is connected to the IS terminal. The level conversion circuit 20 shifts input voltage from the IS terminal to positive voltage the polarity of which is reverse to that of the inductor current detection voltage, converts the input voltage to the three current level signals S1, S2, and S3 proportional to the inductor current $I_L$ which flows through the inductor 3, and outputs the three current level signals S1, S2, and S3 at different voltage levels. The first current level signal S1 is outputted from a point at which the resistors R21 and R22 on the reference voltage Vref2 side are connected, and is supplied to the continuous control setting circuit 30. The second current level signal S2 is outputted from a point at which the intermediate resistors R22 and R23 are connected, and is supplied to a comparator 19 and the continuous control setting circuit 30 included in the power factor controller 10. The third current level signal S3 is outputted from a point at which the resistors R23 and R24 on the IS terminal side are connected, and is supplied to the ZCD comparator 16 included in the power factor controller 10. The ZCD comparator 16 compares the third current level signal S3 with reference voltage Vzcd, detects that current which flows through the inductor becomes zero, and outputs the first set pulse S9. That is to say, the ZCD comparator 16 functions as a zero current detection circuit.

The continuous control setting circuit 30 includes a peak hold circuit 40 and a set pulse generation circuit 50 and outputs the second set pulse S8 to the OR circuit 14b illustrated in FIG. 1. An output signal S0 from the RS flip-flop 15 illustrated in FIG. 1 and the first current level signal 51 from the level conversion circuit 20 are inputted to the peak hold circuit 40 of the continuous control setting circuit 30. The peak hold circuit 40 generates a peak level signal S6 from the first current level signal S1. The set pulse generation circuit 50 generates the second set pulse S8 which specifies the timing at which the switching element 4 turns on. The second set pulse S8 functions so as to change the timing at which the switching element 4 turns on to timing before zero current detection timing at the time of the load being heavy. The second set pulse S8 is used for switching a control method from critical current control to continuous current control at the time of the load being heavy.

The peak hold circuit 40 includes a one-shot circuit 41 which generates one-shot pulses S4 and S5 synchronized with timing at which the switching element 4 turns off, a transfer gate 42 which goes into a conducting state by the one-shot pulses S4 and S5, and a holding circuit 43 including a resistor R7 and a capacitor C3 connected in series.

The one-shot circuit 41 includes a MOSFET 31, a constant-current source 32, a capacitor C4, inverters 33 and 34, a NAND circuit 35, and an inverter 36. The output signal S0 from the RS flip-flop 15 is supplied to a gate terminal of the MOSFET 31 to turn on or off the MOSFET 31. The capacitor C4 connected in parallel with the MOSFET 31 repeats a discharge by the MOSFET 31 and a charge by the constant-current source 32. The output signal S0 from the RS flip-flop 15 is inputted to the inverter 33. An input terminal of the inverter 34 is connected to a point at which the capacitor C4 and the constant-current source 32 are connected, and charging voltage of the capacitor C4 is supplied. Output voltage from the inverter 33 and output voltage from the inverter 34 are inputted to the NAND circuit 35 and the one-shot pulse S4 is generated. In addition, the one-shot pulse S4 from the NAND circuit 35 is inverted by the inverter 36 and output voltage from the inverter 36 is the one-shot pulse S5. The one-shot pulses S4 and S5 are supplied to an inverting input terminal and a non-inverting input terminal, respectively, of the transfer gate 42. The holding circuit 43 generates the peak level signal S6 corresponding to the peak value of the first current level signal S1 and outputs it to the set pulse generation circuit 50.

The set pulse generation circuit 50 includes an amplifier (voltage follower) 51, a resistance circuit including two resistors R8 and R9 connected in series, and a comparator 52. The amplifier 51 amplifies (impedance-converts) the peak level signal S6 generated by the peak hold circuit 40. An output terminal of the amplifier 51 is grounded via the resistors R8 and R9. Output voltage from the amplifier 51 which is equal in voltage level to the peak level signal S6 is divided by the resistors R8 and R9 and a reference potential signal S7 is generated. An inverting input terminal of the comparator 52 is connected to a point at which the resistors R8 and R9 are connected, and the reference potential signal S7 is supplied to the inverting input terminal of the comparator 52. The second current level signal S2 is supplied from the level conversion circuit 20 to a non-inverting input terminal of the comparator 52. The comparator 52 compares the second current level signal S2 with the voltage level of the reference potential signal S7 and outputs the second set pulse S8. The second set pulse S8 is inputted to the RS flip-flop 15 via the OR circuit 14b.

FIG. 3 is a timing chart of the waveforms of signals inputted to and outputted from the one-shot circuit 41 included in the continuous control setting circuit illustrated in FIG. 2.

The output signal S0 from the RS flip-flop 15 is supplied to the one-shot circuit 41. The output signal S0 is at a 0 level (low level) from timing before timing t0 to timing t1. The MOSFET 31 is in an off state. This is the same with the switching element 4. At this time a charging current flows from the constant-current source 32 to the capacitor C4, so the capacitor C4 has already been charged to a determined voltage level (high level) at timing t0. Accordingly, during a period from timing t0 to timing t1, a 1 level (high level) is outputted from the inverter 33 to which the output signal S0 is inputted to the NAND circuit 35 and the 0 level is outputted from the inverter 34 to the NAND circuit 35. As a result, output from the NAND circuit 35 is at the 1 level and output from the inverter 36 is at the 0 level. Therefore, the transfer gate 42 is in the off (cutoff) state.

When the output signal S0 becomes the 1 level at timing t1, the MOSFET 31 turns on. As a result, the capacitor C4 discharges and input to the inverter 34 is inverted immediately to the 0 level. Output signals from the two inverters 33 and 34 are inverted to the 0 level and the 1 level, respectively, at the same time. However, output from the NAND circuit 35 is kept at the 1 level, so the off state of the transfer gate 42 does not change. At timing t2 at which the output signal S0 returns next to the 0 level, the 1 level is outputted immediately from the inverter 33. However, a charging current only begins to flow from the constant-current source 32 to the capacitor C4. Output from the inverter 34 is kept at the 1 level. As a result, the output from the NAND circuit 35 is inverted from the 1 level to the 0 level and the output from the inverter 36 is inverted from the 0 level to the 1 level. In addition, the one-shot pulse S4 at the 0 level and the one-shot pulse S5 at the 1 level are inputted from the one-shot circuit 41 to the transfer gate 42.

Accordingly, during a period from timing t2 to timing t3, the transfer gate 42 is in a conducting state by the one-shot pulses S4 and S5 generated by the one-shot circuit 41 as complementary signals, and the first current level signal S1 is inputted to the holding circuit 43. The peak level signal S6 corresponding to the peak value of the first current level signal S1 is inputted to the holding circuit 43 via the transfer gate 42 and is held by the capacitor C3 of the holding circuit 43. That is to say, while the switching element 4 is in an on state, the inductor current $I_L$ continues to increase. Therefore, the maximum value of the inductor current $I_L$ is obtained the very moment the switching element 4 turns off. The one-shot pulses S4 and S5 from the one-shot circuit 41 occur right after the turning off of the switching element 4. Therefore, the peak level signal S6 obtained by sample-and-holding the peak value of the first current level signal S1 corresponding to the peak value of the inductor current $I_L$ is held by the holding circuit 43 (see FIG. 4(A) described later).

When the capacitor C4 is charged at timing t3 by the constant-current source 32 to a level higher than threshold voltage Vth of the inverter 34 in the one-shot circuit 41, output from the inverter 34 is inverted to the 0 level. That is to say, the pulse width of the one-shot pulses S4 and S5 is specified by a period from timing t2 to timing t3. The period from timing t2 to timing t3 is made longish in FIG. 3 for the sake of simplicity, but in reality this period is set to as short time as possible. In this case, it is necessary that the above sample-and-hold operation can be performed in this period.

Figure 4A:
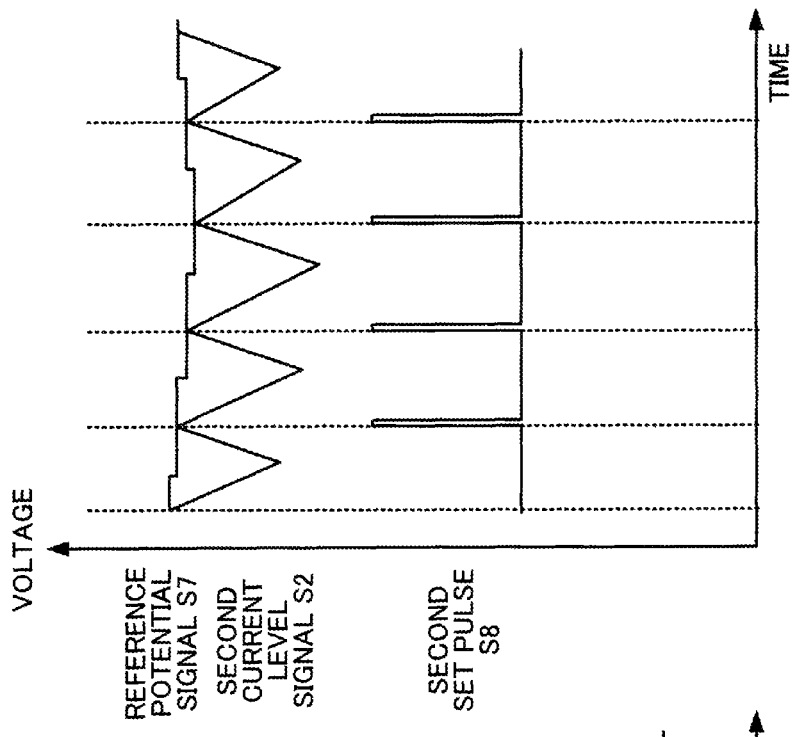
FIGS. 4(A) and 4(B) are timing charts of the waveforms of signals in a peak hold circuit and a set pulse generation circuit, respectively, included in the continuous control setting circuit illustrated in FIG. 2.
Figure 4B:
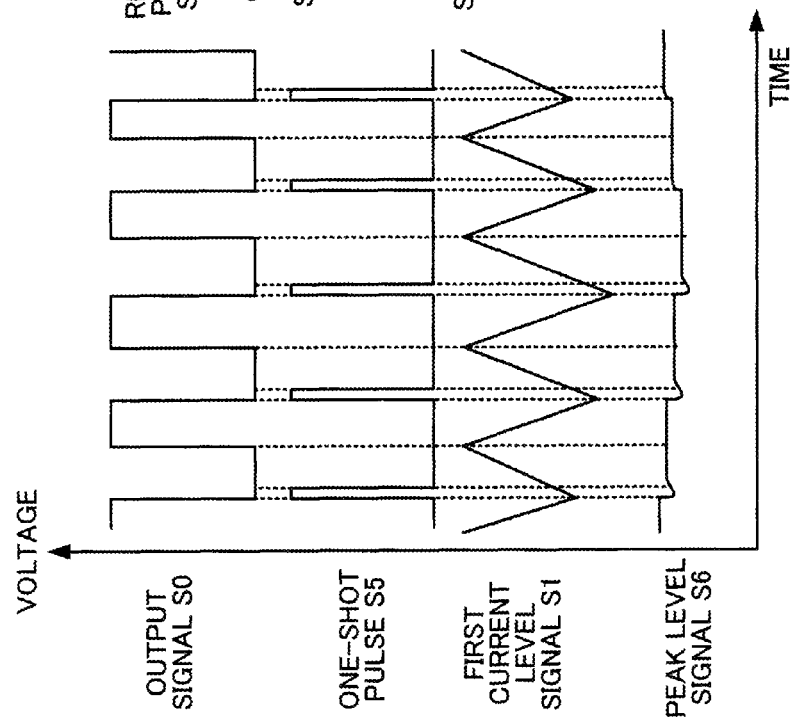

FIGS. 4(A) and 4(B) are timing charts of the waveforms of signals in the peak hold circuit and the set pulse generation circuit, respectively, included in the continuous control setting circuit illustrated in FIG. 2.

FIG. 4(A) illustrates the output signal S0 from the RS flip-flop 15 inputted to the peak hold circuit 40 of the continuous control setting circuit 30, the one-shot pulse S5 generated at timing at which the output signal S0 falls, the first current level signal S1, and the peak level signal S6 generated from the first current level signal S1.

As stated above, when the inductor current $I_L$ flows through the current detection resistor R3, the current detection resistor R3 generates negative inductor current detection voltage and supplies it to the IS terminal. The absolute value of the inductor current detection voltage becomes larger with an increase in the inductor current $I_L$. As a result, the first current level signal S1 extends downward in FIG. 4(A) with an increase in the inductor current $I_L$. Therefore, as the bottom peak value of the first current level signal S1 and the peak level signal S6 illustrated in FIG. 4(A) shift downward, the peak value of the inductor current $I_L$ becomes larger. As is also stated above, the power factor controller 10 makes the phase of alternating input current equal to the phase of alternating input voltage after rectification in the switching power supply circuit. Therefore, the waveform of the peak level signal S6 is approximately similar to that of the alternating input voltage after the rectification. That is to say, much current flows through the switching element 4 and the inductor 3 at the time of the load being heavy and at this time the peak level signal S6 generated from the first current level signal S1 changes with greater curvature.

FIG. 4(B) illustrates the reference potential signal S7 and the second current level signal S2 inputted to the comparator 52 and the second set pulse S8 outputted from the set pulse generation circuit 50 as the result of comparison by the comparator 52. In FIG. 4(B), the voltage levels of the reference potential signal S7 and the second current level signal S2 the phases of which are approximately the same as that of the alternating input voltage after the rectification are compared.

As stated above, the reference potential signal S7 is obtained by level-shifting (voltage-dividing) the peak level signal S6 outputted from the peak hold circuit 40 and changes with greater curvature at the time of the load being heavy. In addition, the second current level signal S2 changes in proportion to the inductor current $I_L$ which flows through the inductor 3. This is the same with the first current level signal S1. The second current level signal S2 differs from the first current level signal S1 only in voltage level. The switching element 4 turns off and the inductor current $I_L$ decreases. As a result, the second current level signal S2 rises. When the second current level signal S2 becomes equal to the reference potential signal S7, the second set pulse S8 which specifies the timing at which the switching element 4 turns on is outputted from the comparator 52.

FIGS. 5(A) and 5(B) are waveforms indicative of the operation of the power factor controller illustrated in FIG. 1. FIG. 5(A) are waveforms indicative of critical operation performed at the time of the load being light. FIG. 5(B) are waveforms indicative of continuous operation performed at the time of the load being heavy.

FIGS. 5(A) and 5(B) illustrate the waveform of the inductor current and the voltage waveforms of the reference potential signal S7, the second current level signal S2, and a signal outputted from the OUT terminal with the waveform of the alternating input voltage from the alternating power supply as reference. The phases of the reference potential signal S7, the second current level signal S2, and the signal outputted from the OUT terminal are approximately the same as that of the alternating input voltage.

The second current level signal S2 (zero current detection level) at the time of the inductor current $I_L$ becoming zero, that is to say, a value L0 obtained by level-shifting the top peak value of the inductor current detection voltage inputted to the IS terminal of the power factor controller 10 is a constant value (=Vref2×(R23+R24)/(R21+R22+R23+R24)) regardless of whether the load is light or heavy. On the other hand, the bottom peak value of the inductor current detection voltage at the time of the load being light is a negative voltage the absolute value of which is small. Accordingly, the bottom peak value of the reference potential signal S7 is higher than the bottom peak value of the reference potential signal S7 illustrated in FIG. 5(B), and the minimum value of the reference potential signal S7 is greater than the zero current detection level L0. As a result, the second set pulse S8 is not outputted from the continuous control setting circuit 30 at the time of the load being light. The first set pulse S9 is outputted at the timing at which the ZCD comparator 16 detects that the inductor current $I_L$ becomes zero, and the switching element 4 turns on. In this case, the switching element 4 changes from an off state to the on state at the timing at which the inductor current $I_L$ becomes zero, so the critical current control method can be realized.

On the other hand, as illustrated in FIG. 5(B), the reference potential signal S7 shifts downward with great curvature at the time of the load being heavy. At the time when part of the reference potential signal S7 becomes smaller than the zero current detection level L0, the second set pulse S8 is outputted prior to the first set pulse S9 from the ZCD comparator 16. Accordingly, a control method is switched from the critical current control to the continuous current control at the time of the load being heavy.

Figure 6:
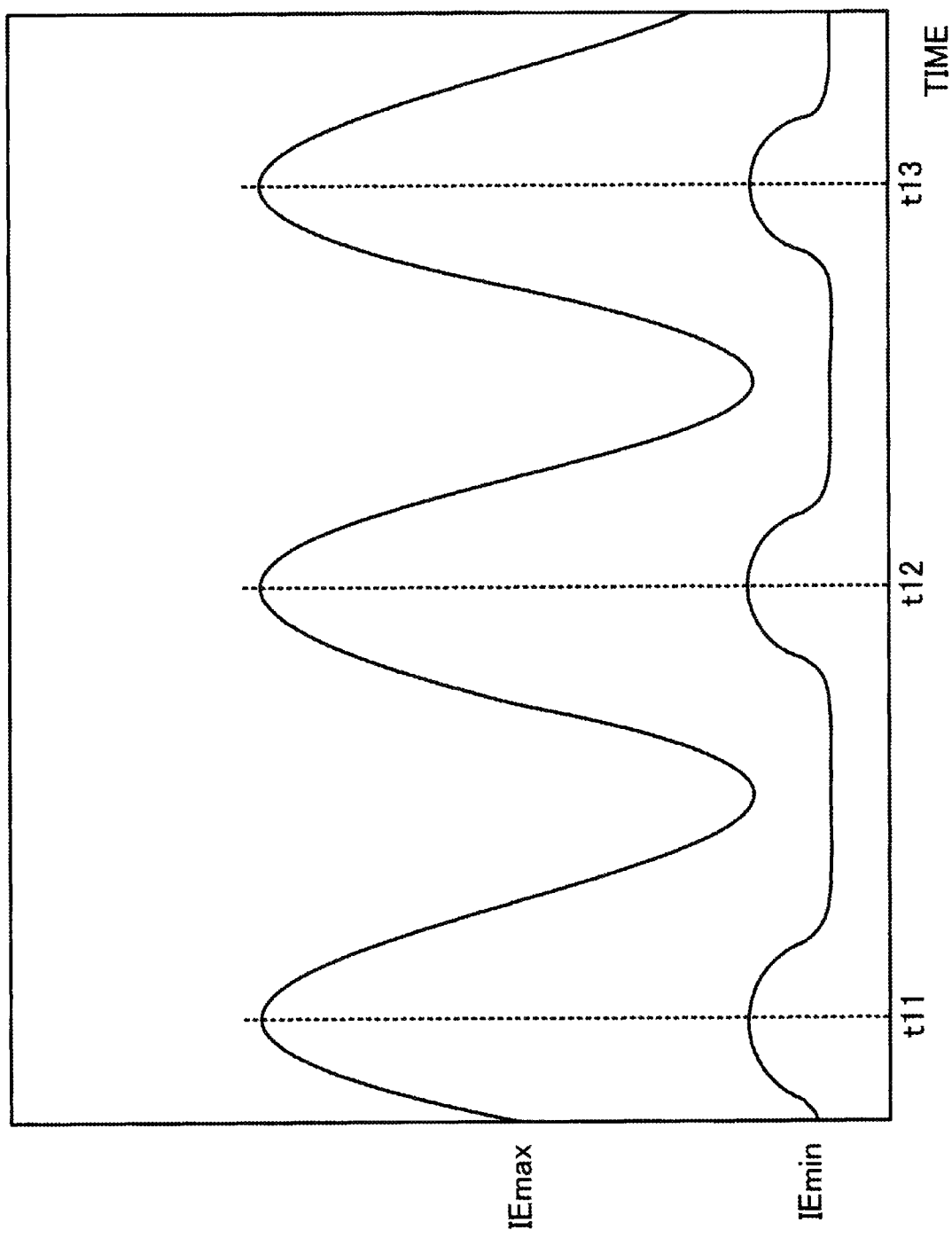
[FIG. 6]

FIG. 6 is the waveform of the inductor current which flows in the switching power supply circuit according to the first embodiment at the time of the load being heavy.

FIG. 6 indicates an envelope curve IEmax drawn by connecting the maximum values of the inductor current $I_L$ and an envelope curve IEmin drawn by connecting the minimum values of the inductor current $I_L$. As described in FIG. 5, whether the load is light or heavy is determined by the use of the inductor current detection voltage and switching between the critical current control method and the continuous current control method is performed. Therefore, it turns out that when an instantaneous value of the envelope curve drawn by connecting the maximum values of the inductor current $I_L$ the phase of which is approximately the same as that of the alternating input voltage is small (that is to say, in an intermediate area between time t11 and time t12 and an intermediate area between time t12 and time t13), the critical current control method is used and that when an instantaneous value of the envelope curve drawn by connecting the maximum values of the inductor current $I_L$ is large, the continuous current control method is used. Even if the inductor 3 the magnitude of which is the same as that of an inductor used in the conventional critical current control, switching from the critical current control method to the continuous current control method is performed at the time of the load being heavy. By doing so, power which can be supplied to the load can be set to a large value and determined direct-current voltage can be supplied to a heavier load.

Figure 7:
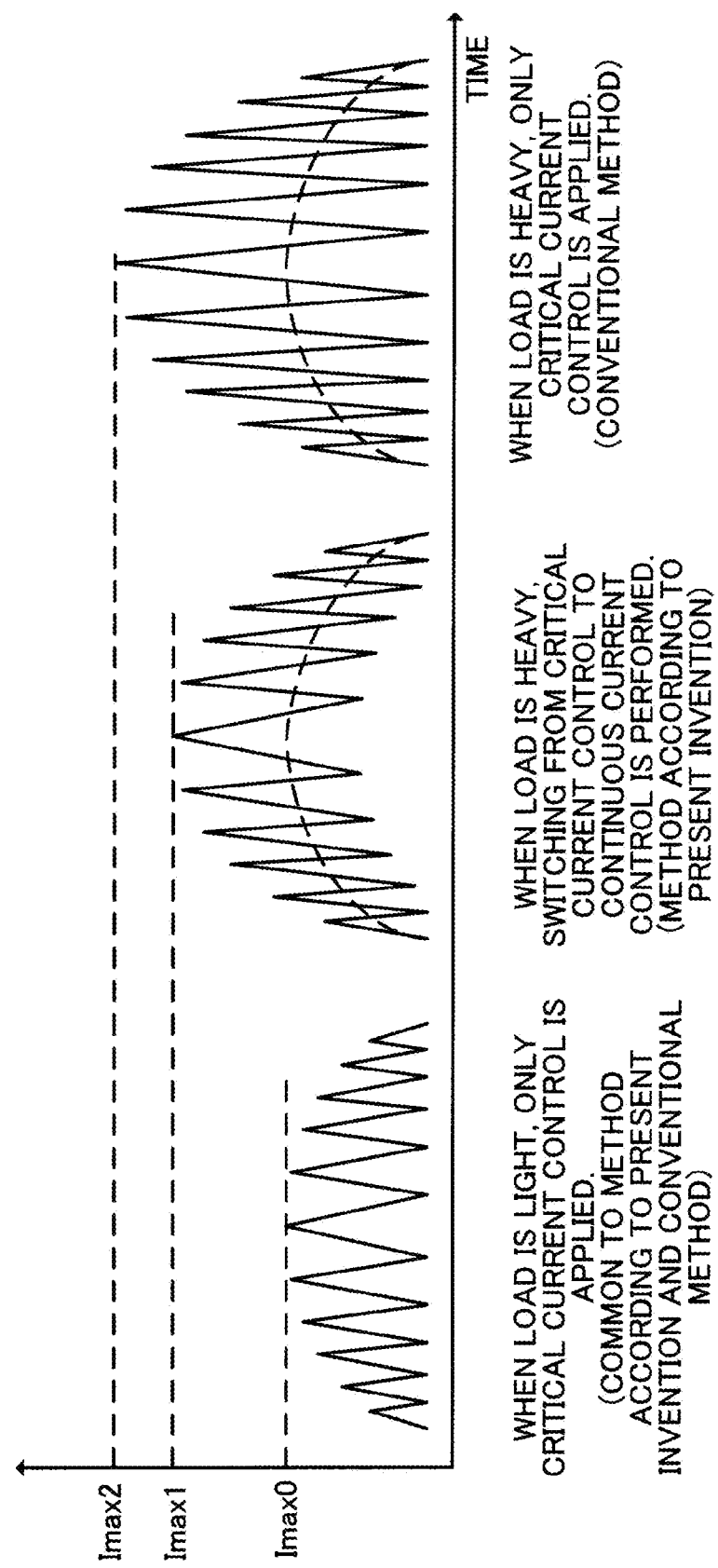
[FIG. 7]

FIG. 7 indicates the peak value of the inductor current which flows at the time of the load being heavy, and also indicates, for comparison, the peak value of inductor current in a conventional circuit using only the critical current control method.

When the load is light, the peak value of the inductor current $I_L$ is Imax0 and is small. At this time the waveform of the inductor current $I_L$ is the same as that of the inductor current in the conventional circuit. In the present invention, however, switching from the critical current control method to the continuous current control method is performed at the time of the load being heavy. With the conventional circuit the inductor current $I_L$ the peak value Imax2 of which is large is made to flow for coping with a heavy load. Compared with the conventional circuit, the same average current value can be obtained even in the case of reducing the peak value of the inductor current $I_L$ to Imax1. This is an advantage of the present invention.

In addition, as stated above, an auxiliary winding is not needed in the present invention. As a result, the costs of a switching power supply circuit can be reduced.

EXAMPLE 2

Figure 8:
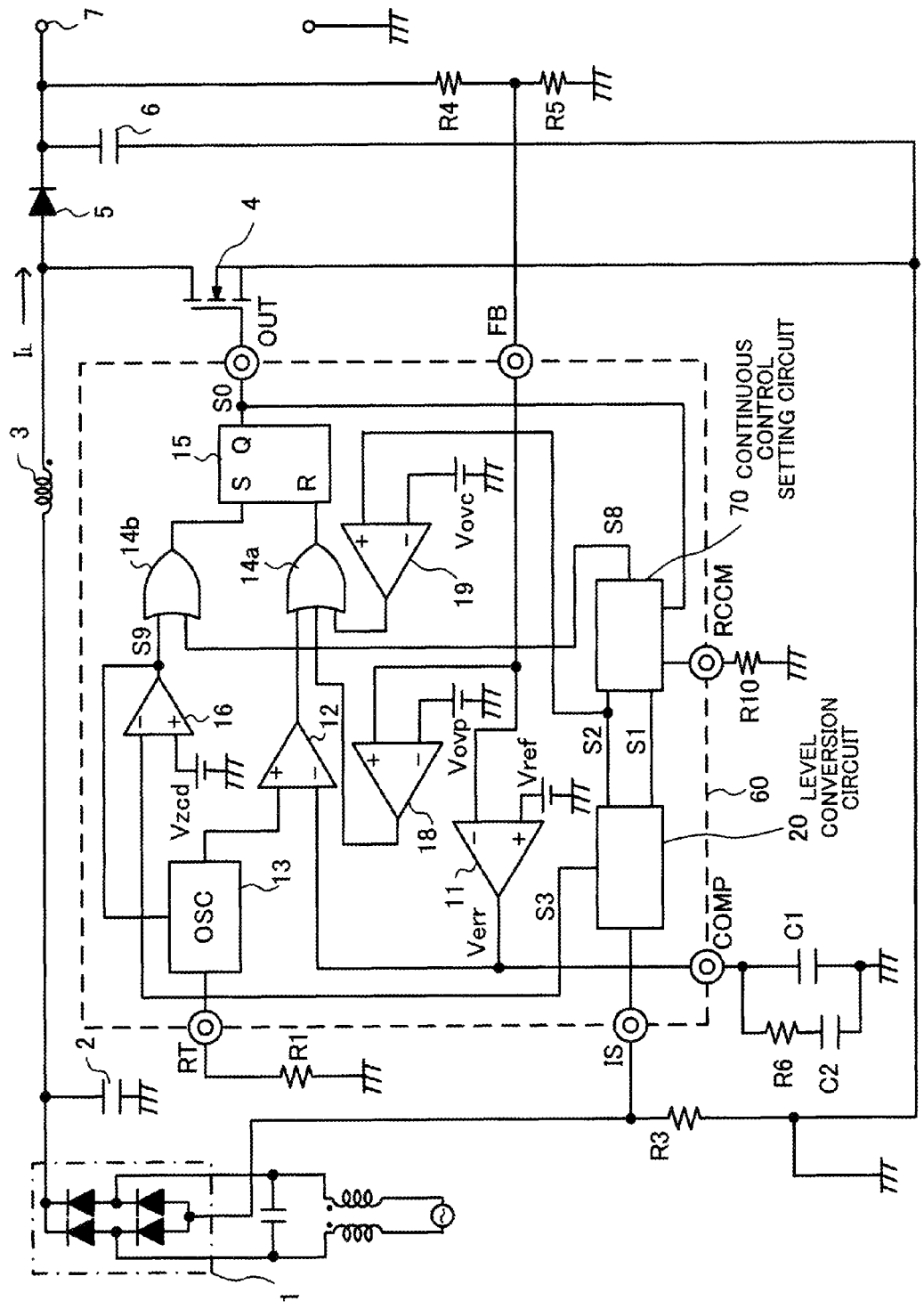
[FIG. 8]

FIG. 8 is a circuit diagram of a switching power supply circuit according to a second embodiment. Components corresponding to those included in the switching power supply circuit (according to the first embodiment) illustrated in FIG. 1 will be marked with the same reference symbols and unnecessary repetitive Descriptions will be omitted.

The switching power supply circuit illustrated in FIG. 8 includes a full-wave rectifier 1 which full-wave rectifies alternating power-supply voltage and which outputs a pulsating current, and an inductor 3 connected to the full-wave rectifier 1. The switching power supply circuit generates determined direct-current output voltage from the alternating power-supply voltage and supplies it to a load. In addition, in order to perform switching between critical operation and continuous operation without an auxiliary winding, the switching power supply circuit on-off controls a switching element 4 by a power factor controller 60 which differs from the conventional power factor controller 100 illustrated in FIG. 13.

The power factor controller 60 in this embodiment differs from the conventional power factor controller 100 illustrated in FIG. 13 in that a level conversion circuit 20 and a continuous control setting circuit 70 are added. In addition, the power factor controller 60 differs from the power factor controller 10 illustrated in FIG. 1 in that a RCCM terminal is added as an external terminal for connecting an external resistor (resistor R10). By adding the RCCM terminal, the resistance value of the resistor R10 externally connected to the power factor controller 60 can be changed to various values. As a result, the voltage level of a reference potential signal to be set in the continuous control setting circuit 70 can be selected arbitrarily by a user.

Figure 9:
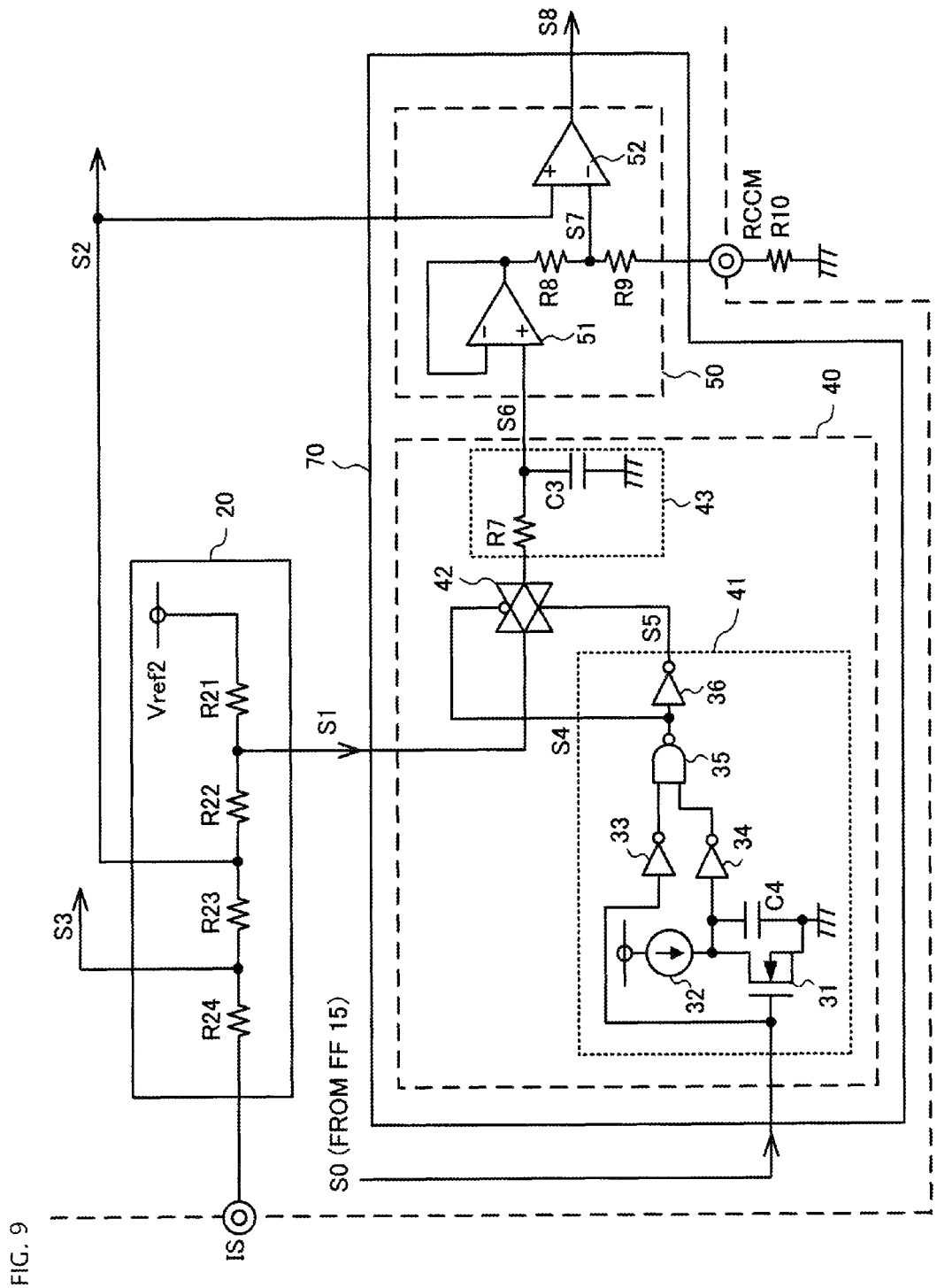
[FIG. 9]

FIG. 9 is a circuit diagram which illustrates the concrete structure of the level conversion circuit and the continuous control setting circuit included in the power factor controller illustrated in FIG. 8.

The level conversion circuit 20 shifts input voltage from an IS terminal to positive voltage the polarity of which is reverse to that of inductor current detection voltage, converts the input voltage to three current level signals S1, S2, and S3 proportional to inductor current $I_L$ which flows through the inductor 3, and outputs the three current level signals S1, S2, and S3 at different voltage levels. This is the same with the switching power supply circuit (according to the first embodiment) illustrated in FIG. 1.

The continuous control setting circuit 70 includes a peak hold circuit 40 and a set pulse generation circuit 50. As is the same with the continuous control setting circuit 30 illustrated in FIG. 2, the set pulse generation circuit 50 generates a second set pulse S8 which specifies the timing at which the switching element 4 turns on. That is to say, the second set pulse S8 functions so as to change the timing at which the switching element 4 turns on to timing before zero current detection timing at the time of the load being heavy. The second set pulse S8 is used for switching a control method from the critical current control to the continuous current control at the time of the load being heavy.

The peak hold circuit 40 includes a one-shot circuit 41 which generates one-shot pulses S4 and S5 synchronized with timing at which the switching element 4 turns off, a transfer gate 42 which goes into a conducting state by the one-shot pulses S4 and S5, and a holding circuit 43 including a resistor R7 and a capacitor C3 connected in series. The set pulse generation circuit 50 includes an amplifier (voltage follower) 51, a resistance circuit including two resistors R8 and R9 connected in series, and a comparator 52.

These components and the function are the same with the continuous control setting circuit 30 illustrated in FIG. 2. However, the set pulse generation circuit 50 in this embodiment differs from the set pulse generation circuit 50 illustrated in FIG. 2 in that the external resistor R10 can be connected to the resistance circuit including the resistors R8 and R9 via the RCCM terminal of the power factor controller 60. The amplifier 51 amplifies (impedance-converts) a peak level signal S6 generated by the peak hold circuit 40. An output terminal of the amplifier 51 is grounded via the resistors R8 and R9 and the external resistor R10. Therefore, the voltage level of the reference potential signal S7 generated by voltage-dividing an output signal from the amplifier 51 by the resistors R8 and R9 and the external resistor R10 changes according to the resistance value of the external resistor R10.

An inverting input terminal of the comparator 52 is connected to a point at which the resistors R8 and R9 are connected, and the reference potential signal S7 is supplied to the inverting input terminal of the comparator 52. The second current level signal S2 is supplied from the level conversion circuit 20 to a non-inverting input terminal of the comparator 52. The comparator 52 compares the voltage level of the second current level signal S2 with that of the reference potential signal S7 and outputs the second set pulse S8. The second set pulse S8 is inputted to a RS flip-flop 15 via an OR circuit 14*b*.

Figures 10A, 10B:
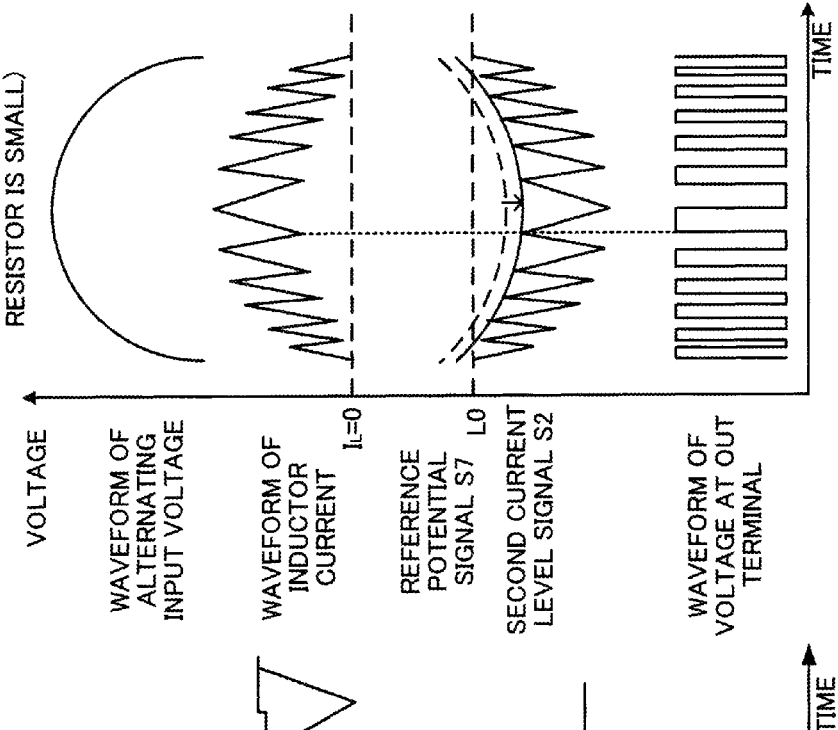
FIGS. 10(A) and 10(B) are views for describing the operation of a power factor controller illustrated in FIG. 8, FIG. 10(A) being the waveform of each signal in a set pulse generation circuit included in the continuous control setting circuit, FIG. 10(B) being the waveform of each signal in the continuous operation of the power factor controller performed at the time of a load being heavy.

FIGS. 10(A) and 10(B) are views for describing the operation of the power factor controller illustrated in FIG. 8. FIG. 10(A) is the waveform of each signal in the set pulse generation circuit included in the continuous control setting circuit. FIG. 10(B) is the waveform of each signal in the continuous operation of the power factor controller performed at the time of the load being heavy.

FIG. 10(A) illustrates the reference potential signal S7 and the second current level signal S2 inputted to the comparator 52 and the second set pulse S8 outputted from the set pulse generation circuit 50 as the result of comparison by the comparator 52.

The reference potential signal S7 is obtained by level-shifting (voltage-dividing) the peak level signal S6 outputted from the peak hold circuit 40 and changes with greater curvature at the time of the load being heavy. This is the same with the continuous control setting circuit 30 illustrated in FIG. 2. In addition, the second current level signal S2 changes in proportion to the inductor current $I_L$ which flows through the inductor 3 (waveforms of the second current level signal S2 and the inductor current $I_L$ become similar). This is the same with the first current level signal S1. The second current level signal S2 differs from the first current level signal S1 only in voltage level. The switching element 4 turns off and the inductor current $I_L$ decreases. As a result, the second current level signal S2 rises. When the second current level signal S2 becomes equal to the reference potential signal S7, the second set pulse S8 which specifies the timing at which the switching element 4 turns on is outputted from the comparator 52. The voltage level of the reference potential signal S7 the phase of which is approximately the same as that of the alternating input voltage after rectification increases or decreases according to the resistance value of the external resistor R10.

FIG. 10(B) illustrates the waveform of the inductor current and the voltage waveforms of the reference potential signal S7, the second current level signal S2, and a signal outputted from an OUT terminal with the waveform of the alternating input voltage from alternating power supply as reference. The phases of the reference potential signal S7, the second current level signal S2, and the signal outputted from the OUT terminal are approximately the same as that of the alternating input voltage.

As indicated in FIG. 5(A) described above, the second current level signal S2 (zero current detection level) at the time of the inductor current $I_L$ becoming zero is a value LO obtained by level-shifting the top peak value of the inductor current detection voltage, and is a constant value (=Vref2× (R23+R24)/(R21+R22+R23+R24)) regardless of whether the load is light or heavy. The bottom peak value of the inductor current detection voltage at the time of the load being light is a negative voltage the absolute value of which is small. Accordingly, the bottom peak value of the reference potential signal S7 is higher than the bottom peak value of the reference potential signal S7 illustrated in FIG. 10(B), and the minimum value of the reference potential signal S7 is greater than the zero current detection level L0 (not illustrated). As a result, the second set pulse S8 is not outputted from the continuous control setting circuit 70 at the time of the load being light. The first set pulse S9 is outputted at the timing at which a ZCD comparator 16 detects that the inductor current $I_L$ becomes zero, and the switching element 4 turns on. The switching element 4 changes from an off state to an on state in this way at the timing at which the inductor current $I_L$ becomes zero. If the magnitude of the load is smaller than or equal to a determined value, then the critical current control method can be realized.

As illustrated in FIG. 10(B), the reference potential signal S7 shifts downward with great curvature at the time of the load being heavy. At the time when part of the reference potential signal S7 becomes smaller than the zero current detection level L0, the second set pulse S8 illustrated in FIG. 10(A) is outputted prior to the first set pulse S9 from the ZCD comparator 16. Accordingly, a control method is switched from the critical current control to the continuous current control at the time of the load being heavy. The timing at which a control method is switched from the critical current control to the continuous current control can be changed by selecting the resistance value of the external resistor R10. That is to say, by setting the resistance value of the external resistor R10 to a small value, the level of the reference potential signal S7 of FIG. 10(B) at which the switching element 4 turns on at continuous current control time can be lowered from the position indicated by a dashed line to the position indicated by a solid line. Therefore, by selecting the resistance value of the external resistor R10 connected to the power factor controller 60, a power level at which switching from the critical current control at the time of the load being light to the continuous current control at the time of the load being heavy can be set properly for each power supply.

Figure 11:
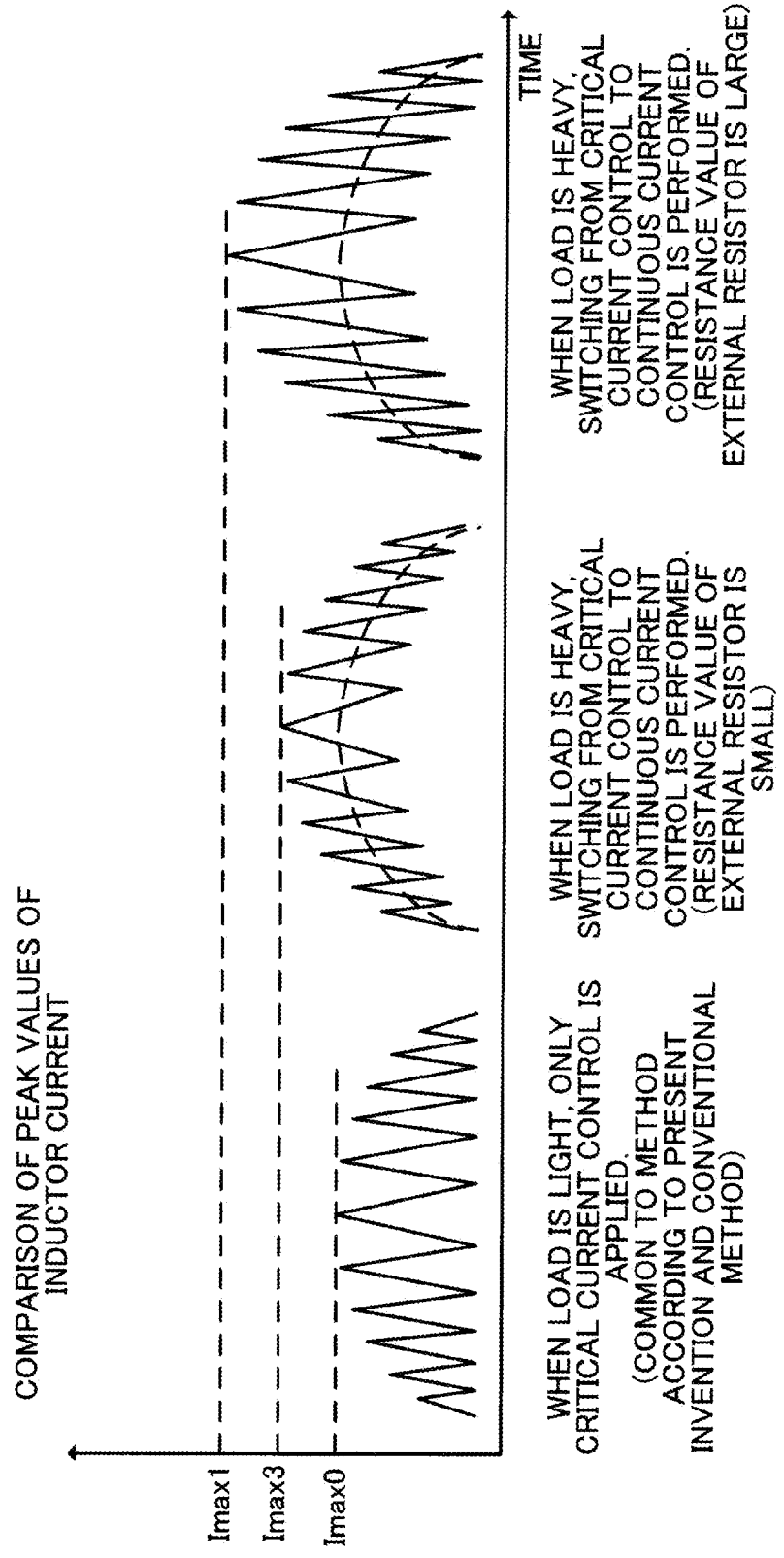
[FIG. 11]

FIG. 11 illustrates the comparison result of the peak values of the inductor current at the time of the load being heavy in the case of external resistors different in resistance value being connected to the power factor controller illustrated in FIG. 8.

In the present invention in which switching from the critical current control method to the continuous current control method is performed at the time of the load being heavy, a powerful peak current Imax1 or Imax3 is made to flow through the heavy load to cope with it. In this case, the peak value of the inductor current can be reduced by connecting external resistors different in resistance value. That is to say, the RCCM terminal is added as an external terminal of the power factor controller 60 and the resistance value of the external resistor R10 connected to the RCCM terminal is controlled. By doing so, the rate of a reduction in the peak value of the inductor current can be controlled (Imax1>Imax3). When peak current is Imax0 and is weak, the load is light. At this time the waveform of the inductor current is the same as that of inductor current which flows in a conventional switching power supply circuit.

Figure 12:
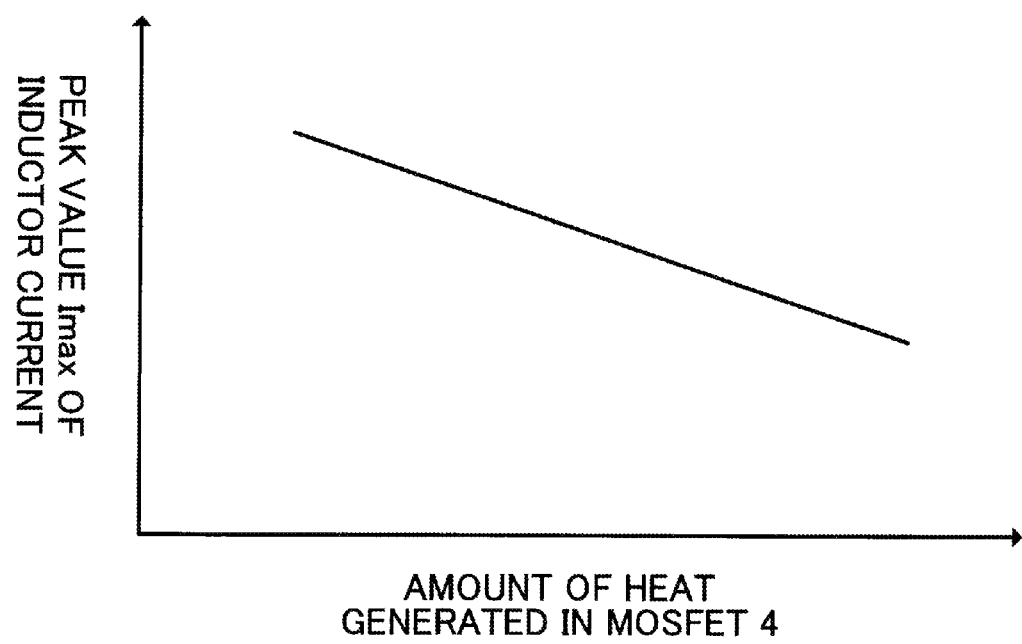
[FIG. 12]

FIG. 12 illustrates a change in the inductor current with respect to heat generation in the switching element.

If the resistance value of the external resistor R10 is set to a small value, the peak value of the inductor current becomes small. However, if the peak value of the inductor current becomes small, the amount of heat generated in the switching element (MOSFET) 4 of the switching power supply circuit becomes large. Accordingly, a designer of power supply can freely set the amount of heat generated in the switching element 4 according to the specifications of the power supply by controlling the resistance value of the external resistor R10 externally connected to the power factor controller 60.

REFERENCE SIGNS LIST

1 Full-Wave Rectifier
2, 6 Capacitor
3 Inductor
4 Switching Element (MOSFET)
5 Diode
7 Output Terminal
10, 60 Power Factor Controller
11 Error Amplifier
12 PWM Comparator
13 Oscillator
14a, 14b OR Circuit
15 RS Flip-Flop
16 ZCD Comparator
17 Timer
18 OVP Comparator
19 Comparator
20 Level Conversion Circuit
30, 70 Continuous Control Setting Circuit
40 Peak Hold Circuit
41 One-Shot Circuit
42 Transfer Gate
43 Holding Circuit
50 Set Pulse Generation Circuit
51 Amplifier
52 Comparator
C1 through C4 Capacitor
R1 through R9, R21 through R24 Resistor
R10 External Resistor
S0 Output Signal S0 from RS Flip-Flop 15
S1 First Current Level Signal
S2 Second Current Level Signal
S3 Third Current Level Signal
S4, S5 One-Shot Pulse
S6 Peak Level Signal
S7 Reference Potential Signal
S8 Second Set Pulse
S9 First Set Pulse

The invention claimed is:

1. A switching power supply circuit for supplying a determined direct-current output voltage from an alternating power supply to a load, the switching power supply circuit comprising:
a rectifying circuit which full-wave rectifies an alternating power-supply voltage to output a pulsating current;
an inductor connected to the rectifying circuit;

a switching element;
an output capacitor;
an inductor current detection circuit which detects current that flows through the inductor and which outputs an inductor current detection voltage;
a level conversion circuit which converts the inductor current detection voltage to a first current level signal and a second current level signal different in voltage level;
a continuous control setting circuit which generates a reference potential signal, a phase of which is approximately the same as a phase of a full-wave rectified alternating input voltage, from the first current level signal and which compares a voltage level of the reference potential signal with a voltage level of the second current level signal to generate a signal that specifies timing at which the switching element turns on; and
a zero current detection circuit which detects that current which flows through the inductor becomes zero,
wherein the switching element turns on at the earlier timing of a timing of the continuous control setting circuit generating the signal that specifies the timing at which the switching element may turn on, and a timing at which the zero current detection circuit detects that current which flows through the inductor becomes zero.

2. The switching power supply circuit according to claim 1, wherein the level conversion circuit generates the first current level signal and the second current level signal by shifting the inductor current detection voltage to voltage a polarity of which is reverse to a polarity of the inductor current detection voltage.

3. The switching power supply circuit according to claim 2, wherein:
the inductor current detection circuit is a current detection resistor located on a path between the rectifying circuit and the inductor and outputs the inductor current detection voltage which is negative from one end of the current detection resistor; and
the level conversion circuit includes a first resistor, a second resistor, and a third resistor connected in series between positive reference voltage and output of the inductor current detection circuit, outputs voltage at a point at which the first resistor and the second resistor are connected as the first current level signal, and outputs voltage at a point at which the second resistor and the third resistor are connected as the second current level signal.

4. The switching power supply circuit according to claim 1, wherein the continuous control setting circuit includes:
a peak hold circuit which holds a voltage level of the first current level signal at each timing at which the switching element turns off and which generates a peak level signal; and
a set pulse generation circuit which converts a voltage level of the peak level signal to generate the reference potential signal and which compares the voltage level of the reference potential signal with the voltage level of the second current level signal to generate a set pulse that specifies the timing at which the switching element turns on.

5. The switching power supply circuit according to claim 4, wherein the peak hold circuit includes:
a one-shot circuit which generates one-shot pulses synchronized with a timing at which the switching element turns off;
a transfer gate to which the first current level signal is inputted and which goes into a conducting state by the one-shot pulses; and
a holding circuit which holds the peak level signal outputted via the transfer gate.

6. The switching power supply circuit according to claim 4, wherein the set pulse generation circuit includes:
an amplifier which amplifies the peak level signal generated by the peak hold circuit to generate the reference potential signal; and
a comparator which compares the voltage level of the second current level signal with the voltage level of the reference potential signal to output the set pulse.

7. The switching power supply circuit according to claim 1, wherein:
the inductor current detection circuit is a current detection resistor located on a path between the rectifying circuit and the inductor and outputs the inductor current detection voltage which is negative from one end of the current detection resistor; and
the level conversion circuit includes a first resistor, a second resistor, and a third resistor connected in series between a positive reference voltage and an output of the inductor current detection circuit, outputs a voltage at a point at which the first resistor and the second resistor are connected as the first current level signal, and outputs voltage at a point at which the second resistor and the third resistor are connected as the second current level signal.

8. A power factor controller included in a switching power supply circuit for supplying a determined direct-current output voltage from an alternating power supply to a load, the switching power supply circuit comprising:
a rectifying circuit which full-wave rectifies an alternating power-supply voltage to output a pulsating current;
an inductor connected to the rectifying circuit;
a switching element;
an output capacitor; and
an inductor current detection circuit which detects current that flows through the inductor and which outputs an inductor current detection voltage, the power factor controller comprising:
a level conversion circuit which converts the inductor current detection voltage to a first current level signal and a second current level signal different in voltage level;
a continuous control setting circuit which generates a reference potential signal, a phase of which is approximately the same as a phase of a full-wave rectified alternating input voltage, from the first current level signal and which compares a voltage level of the reference potential signal with a voltage level of the second current level signal to generate a signal that specifies timing at which the switching element turns on; and
a zero current detection circuit which detects that current which flows through the inductor becomes zero,
wherein the switching element turns on at the earlier timing of a timing of the continuous control setting circuit generating the signal that specifies the timing at which the switching element may turn on, and a timing at which the zero current detection circuit detects that current which flows through the inductor becomes zero.

9. The power factor controller according to claim 8, wherein the continuous control setting circuit includes:
a peak hold circuit which holds a voltage level of the first current level signal at each timing at which the switching element turns off and which generates a peak level signal;
a set pulse generation circuit which converts a voltage level of the peak level signal to generate the reference potential signal and which compares the voltage level of the reference potential signal with the voltage level of the second current level signal to generate a set pulse that specifies the timing at which the switching element turns on; and an external terminal which is used for changing the voltage level of the reference potential signal by a resistance value of a resistor externally connected.

* * * * *